US010176799B2

(12) United States Patent
Hori et al.

(10) Patent No.: US 10,176,799 B2
(45) Date of Patent: Jan. 8, 2019

(54) METHOD AND SYSTEM FOR TRAINING LANGUAGE MODELS TO REDUCE RECOGNITION ERRORS

(71) Applicant: Mitsubishi Electric Research Laboratories, Inc., Cambridge, MA (US)

(72) Inventors: Takaaki Hori, Lexington, MA (US); Chiori Hori, Lexington, MA (US); Shinji Watanabe, Arlington, MA (US); John Hershey, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/013,239

(22) Filed: Feb. 2, 2016

(65) Prior Publication Data
US 2017/0221474 A1    Aug. 3, 2017

(51) Int. Cl.
| | |
|---|---|
| *G10L 15/16* | (2006.01) |
| *G10L 15/06* | (2013.01) |
| *G10L 15/08* | (2006.01) |
| *G10L 15/02* | (2006.01) |
| *G10L 15/19* | (2013.01) |
| *G06N 3/02* | (2006.01) |

(52) U.S. Cl.
CPC ............ *G10L 15/063* (2013.01); *G10L 15/02* (2013.01); *G10L 15/08* (2013.01); *G10L 15/16* (2013.01); *G10L 15/19* (2013.01); *G06N 3/02* (2013.01)

(58) Field of Classification Search
CPC ... G10L 15/16; G10L 15/1815; G10L 15/183; G10L 15/197; G10L 15/08; G10L 15/144; G10L 15/19; G06F 17/2715; G06F 17/2818; G06N 3/0454; G06N 3/0472
USPC .. 704/231, 251, 232, 236, 256, 1, 4, 9, 243, 704/257, 270.1, 235, 255, 240, 245
See application file for complete search history.

(56) References Cited

U.S. PATENT DOCUMENTS

| | | |
|---|---|---|
| 7,680,659 B2 | 3/2010 | Gao et al. |
| 9,263,036 B1 * | 2/2016 | Graves .................... G10L 15/16 |

(Continued)

OTHER PUBLICATIONS

T. Mikolov, M. Karafiat, L. Burget, J. Cernocky, and S. Khudanpur, "Recurrent neural network based language model," in Proc. Interspeech, 2010, pp. 1045-1048.

(Continued)

*Primary Examiner* — Vijay B Chawan
(74) *Attorney, Agent, or Firm* — Gene Vinokur; James McAleenan; Hironori Tsukamoto (57) ABSTRACT

A method and for training a language model to reduce recognition errors, wherein the language model is a recurrent neural network language model (RNNLM) by first acquiring training samples. An automatic speech recognition system (ASR) is applied to the training samples to produce recognized words and probabilites of the recognized words, and an N-best list is selected from the recognized words based on the probabilities. determining word errors using reference data for hypotheses in the N-best list. The hypotheses are rescored using the RNNLM. Then, we determine gradients for the hypotheses using the word errors and gradients for words in the hypotheses. Lastly, parameters of the RNNLM are updated using a sum of the gradients.

20 Claims, 6 Drawing Sheets

(56) References Cited

U.S. PATENT DOCUMENTS

| | | | | |
|---|---|---|---|---|
| 2004/0167778 | A1* | 8/2004 | Valsan | G10L 15/16 704/231 |
| 2004/0249628 | A1* | 12/2004 | Chelba | G06F 17/2715 704/4 |
| 2008/0114595 | A1* | 5/2008 | Vair | G10L 15/08 704/236 |
| 2008/0215311 | A1* | 9/2008 | Chelba | G06F 17/2715 704/9 |
| 2015/0066496 | A1* | 3/2015 | Deoras | G10L 15/16 704/232 |

OTHER PUBLICATIONS

T. Mikolov, S. Kombrink, L. Burget, J. Cernocky, and S. Khudanpur, "Extensions of recurrent neural network language model," in Proc. ICASSP, 2011, pp. 5528-5531.

Sepp Hochreiter and Jürgen Schmidhuber, "Long short-term memory," Neural computation, vol. 9, No. 8, pp. 1735-1780, 1997.

Brian Roark, Murat Saraclar, Michael Collins, and Mark Johnson, "Discriminative language modeling with conditional random fields and the perceptron algorithm," in Proceedings of the 42nd Annual Meeting on Association for Computational Linguistics. Association for Computational Linguistics, 2004, p. 47.

Y Tachioka and S Watanabe, "A discriminative method for recurrent neural network language models," in Acoustics, Speech, and Signal Processing (ICASSP), 2015 IEEE International Conference on, 2015.

Brian Roark, "A survey of discriminative language modeling approaches for large vocabulary continuous speech recognition," Automatic Speech and Speaker Recognition: Large Margin and Kernel Methods, pp. 117-137, 2009.

Jen-Wei Kuo and Berlin Chen, "Minimum word error based discriminative training of language models.," in Interspeech, 2005, pp. 1277-1280.

Tachioka et al. "Disctiminative method for recurrent neural network language models," 2015 IEEE International Conference on Acoustics, Speech and Signal Processing, Apr. 19, 2015, pp. 5386-5390.

Mangu et al. "Finding consensus in speech recognition and other applications of confusion networks." Arxiv.org. Cornell University Library, 201 Olin Library Cornell University Ithaca NY 14853. Oct. 7, 2000.

Sak et al. "Sequence Discriminative Distributed Training of Long Short-Term Memory Recurrent Neural Networks," Fifteenth Annual Conference of the international speech communication association. Jan. 1, 2014. http://193.6.4.39/~czap/letoltes/IS14/IS2014/PDF/AUTHOR/IS141312.pdf.

\* cited by examiner

METHOD AND SYSTEM FOR TRAINING LANGUAGE MODELS TO REDUCE RECOGNITION ERRORS

RELATED APPLICATION

This Patent Application is related to U.S. Ser. No. 14/959,132. "Method and System for Role Dependent Context Sensitive Spoken and Textual Language Understanding with Neural Networks," filed by Hori et al., on Dec. 4, 2015, and incorporated herein by reference. That Application discloses a method and system for processing utterances that are acquired either from an automatic speech recognition (ASR) system or text.

FIELD OF THE INVENTION

This invention relates generally to minimum word error (MWE) training of a recurrent neural network language model (RNNLM) for speech recognition. Particularly the method uses a long short-term memory and language models.

BACKGROUND OF THE INVENTION

Language models are indispensable for large-vocabulary continuous-speech recognition. The models, which are usually based on n-grain statistics, provide prior probabilities of hypothesized sentences to disambiguate their acoustical similarities. To construct an n-grain model, text corpora are used to estimate the probability of a word's occurrence conditional on the preceding n−1 words, where n is typically 3 or 4.

On the other hand, continuous space language models based on neural networks have attracted increased attention in recent years. With that approach, word indexes are mapped to a continuous space and word probability distributions are estimated as smooth functions in that space. Consequently, that approach makes it possible to provide better generalization for unrecognized n-grams.

A recurrent neural network language model (RNNLM) is an instance of such continuous space language models. The RNNLM has a hidden layer with re-entrant connections to itself with a one word delay. Hence, the activations of the hidden units play a role of memory keeping a history from the beginning of the speech. Accordingly, the RNNLM can estimate word probability distributions by taking long-distance inter-word dependencies into account.

In addition, more advanced RNNLMs, Long Short-Term Memory (LSTM) RNNs are used in language modeling for speech recognition, which can characterize longer contextual information than the conventional RNNLMs by handling the memory with several gating functions, and improves the recognition accuracy.

In most cases, RNNLMs are trained to minimize a cross entropy of estimated word probabilities against the correct word sequence given a history, which corresponds to maximizing the likelihood for given training data. However, this training does not necessarily maximize a performance measure in a target task, i.e., it does not minimize word error rate (WER) explicitly in speech recognition. For n-gram-based language models, several discriminative training methods are known to solve this problem, but those for RNNLMs have been insufficiently investigated so far. A hidden activation vector of the RNNLM can be added to the feature vector for a log-linear language model. In addition, a cross entropy criterion can be modified based on word confidence measure.

Discriminative training methods are widely used in speech recognition, where acoustic or language models are trained to optimize their parameters based on a discriminative criterion. Unlike the maximum likelihood approach, those methods can improve discriminative performance of models by taking a set of competing hypotheses for each training sample into account.

In speech recognition, a hypothesis means a word sequence inferred by an ASR system for a given utterance. ASR systems find multiple hypotheses for an input utterance and select the best-scored hypothesis among them, where each hypothesis is scored with its probability obtained by the acoustic and language models. In discriminative training, the multiple hypotheses are usually used to train the models based on a discriminative criterion.

In language modeling, n-grain probabilities are directly optimized with a minimum classification error criterion, and log-linear language models with n-gram features are trained with a perceptron procedure, reranking boosting, and minimum word error rate training. Because those methods are designed for n-gram models or n-gram-feature-based models, they cannot be used directly for neural network-based language models including RNNLMs. Another method uses a hidden activation vector of an RNNLM as additional features for a log-linear language model. However, the RNNLM itself is not trained discriminatively.

A discriminative training method for RNNLMs uses a likelihood ratio of each reference word to the corresponding hypothesized word is used instead of the cross entropy. However, that method does not sufficiently exploit the potential ability of discriminative training with regards the following reasons;

- It considers only one competitor for each reference word, where the competitor is a hypothesized word in the 1-best ASR result.
- In general, it is better to consider multiple competitors in discriminative training.
- It is not a sequence training because word-to-word alignment is fixed during the training. This means that inter-dependence of word errors is ignored.
- It does not directly minimize word error rate that is the ASR performance measure.

SUMMARY OF THE INVENTION

The embodiments of the invention provide a method and system for training a language model to reduce recognition errors, wherein the language models is a recurrent neural network language model (RNNLMs) that can be used for speech recognition. RNNLMs are usually trained to minimize a cross entropy of estimated word probabilities of a correct word sequence, which corresponds to maximum likelihood criterion. That training does not necessarily maximize a performance measure in a target task, i.e., it does not minimize word error rate (WER) explicitly in speech recognition.

To solve such a problem, several discriminative training methods are known for n-gram language models, but those for RNNLMs have not been sufficiently described so far. The embodiments provide the a MWE training method for RNNLMs with significant WER reductions. The MWE method can be applied to a conventional Elman-type RNNLM, as well as a more advanced model, such as a Long Short-Term Memory (LSTM) RNNLM. Also disclosed is an efficient MWE training with N-best lists on graphics processor units (GPU).

The MWE criterion can be propagated in a back-propagation through time (BPTT) procedure for RNNLMs, which minimizes the expected word error rate using a set of N-best lists generated by a speech recognizer. Although that method increases the training computation in proportion to the size of N-best list, it can be performed in realistic time by parallelizing the BPTT over multiple word sequences using graphics processing units (GPU) multi-processors.

DETAILED DESCRIPTION OF THE PREFERRED EMBODIMENTS

The embodiments of the invention provide a method and system for training a language model to reduce recognition errors, wherein the language model is a recurrent neural network language model (RNNLM) that can be used for speech recognition. The RNNLM includes hypotheses.

Recurrent Neural Network Language Models

Figure 1:
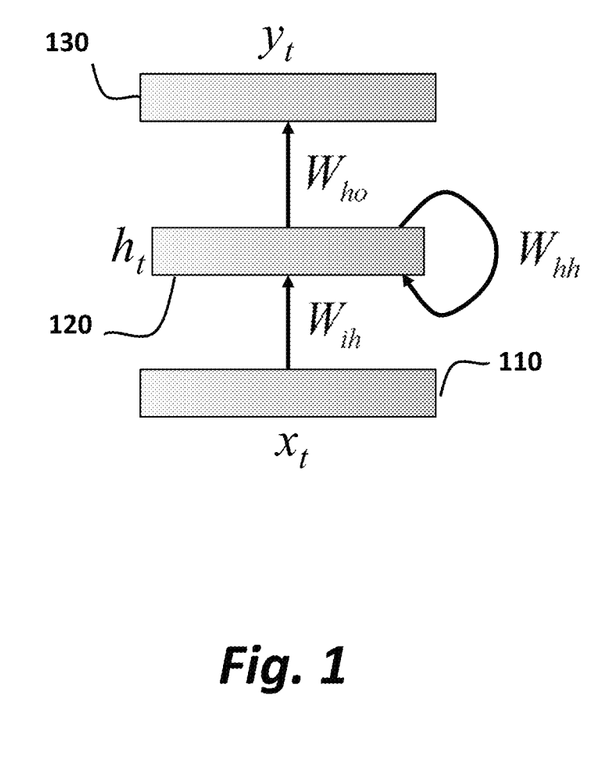
FIG. 1 is a block diagram of a word-based recurrent neural network language model (RNNLM) according to embodiments of the invention.

We discriminatively train a word-based RNNLM, a class-based RNNLM, and an LSTM RNNLM based on a minimum word error criterion. For simplicity of this description, we start with a word-based RNNLM as shown in FIG. 1.

Given a word sequence $w_1, \ldots, w_t, \ldots, w_T$ of a vocabulary V, the input vector $x_t \in \{0,1\}^{|V|}$ 110 for time index t is represented as $$x_t = \text{OneHot}(w_{t-1}), \quad (1)$$

where OneHot(w) denotes a 1-of-N coding of word w, which converts a word index to a one hot vector representation.

The D dimensional activation vector $h_t \in [0,1]^D$ 120 in the current hidden layer are determined as $$h_t = \sigma(W_{ih}x_t + W_{hh}h_{t-1}), \quad (2)$$

where $W_{ih} \in R^{D \times |V|}$ and $W_{hh} \in R^{D \times D}$ are the input-hidden and hidden-hidden weight matrices, where $\sigma(\bullet)$ is an element-wise sigmoid function.

The output vector $y_t \in [0,1]^{|V|}$ 130, which corresponds to the predicted word distribution, is $$y_t = \zeta(W_{ho}h_t), \quad (3)$$

where $W_{ho}$ is a weight matrix of the output layer. $\zeta(\bullet)$ denotes a softmax function, or normalized exponents, which determines the softmax over the elements in a given vector.

The word occurrence probability of $w_t$ in a context $h_t$ is $$P(w_t|h_t) = y_t[w_t], \quad (4)$$

where $y_t[w_t]$ indicates the $w_t$-th element of vector $y_t$. Hereafter, we use [•] to specify an element in the vector.

Figure 4:
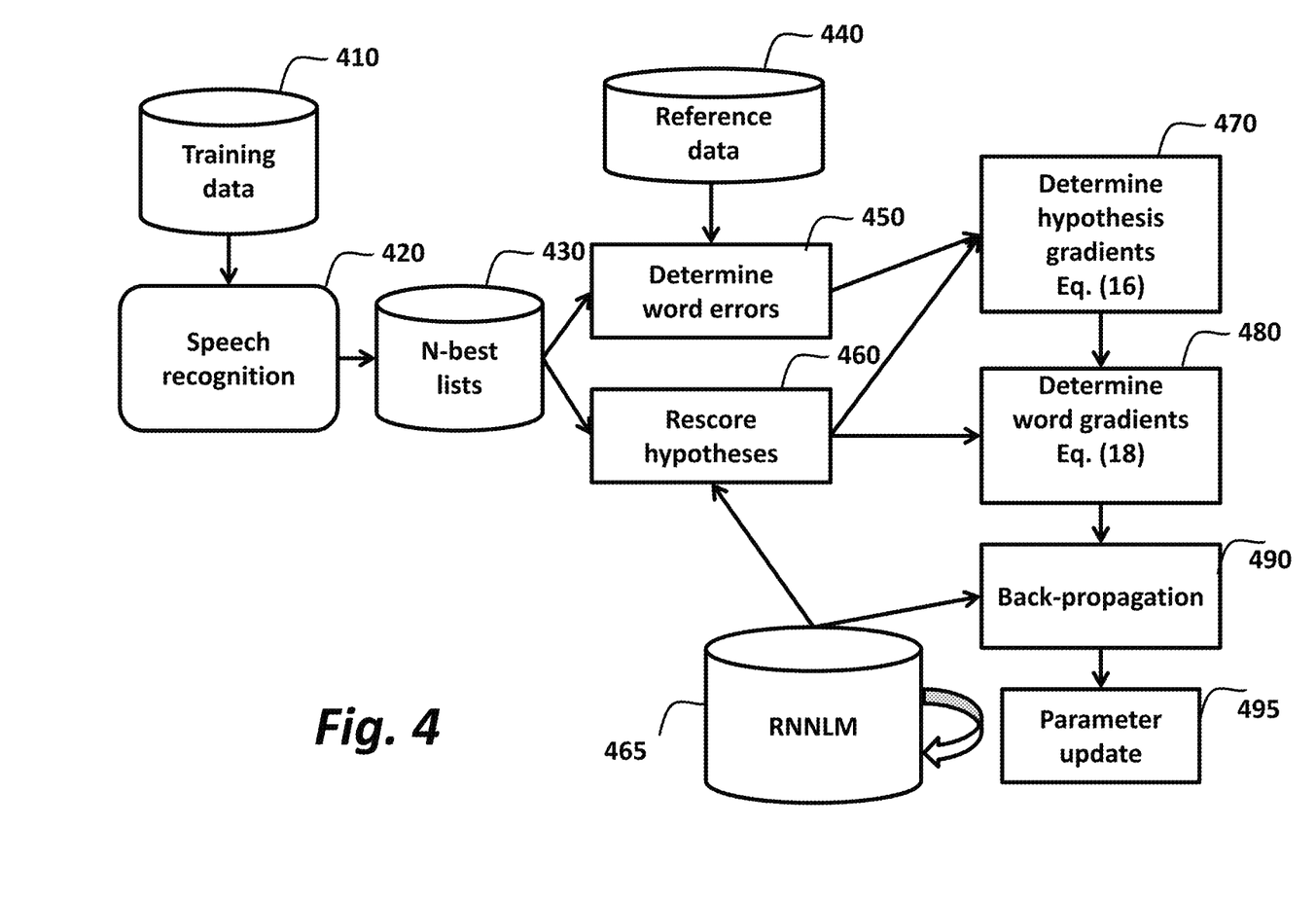
FIG. 4 is a block diagram of a method and system for training a language model to reduce recognition errors according to embodiments of the invention.

FIG. 4 shows method and system according to the embodiments of the invention. Input is a word sequence, e.g., utterences of training data 410, which is fed to an automatic speech recognizer (ASR) 420 to produce recognized word from which we select an N-best list 430, i.e., the N-best hypotheses with the highest possibilities for the utterence. Using reference data 440, and we determine 450 word erros, and rescore 465 our hypotheses as described in detail below using the RNNLM 465. Then, we determine 470 and 480 gradiants for the hypotheses and recognized words using Eqs. 16 and 18 as described below. These are back-propagated 490, and the parameters of the RNNLM are updated 495.

Figure 5:
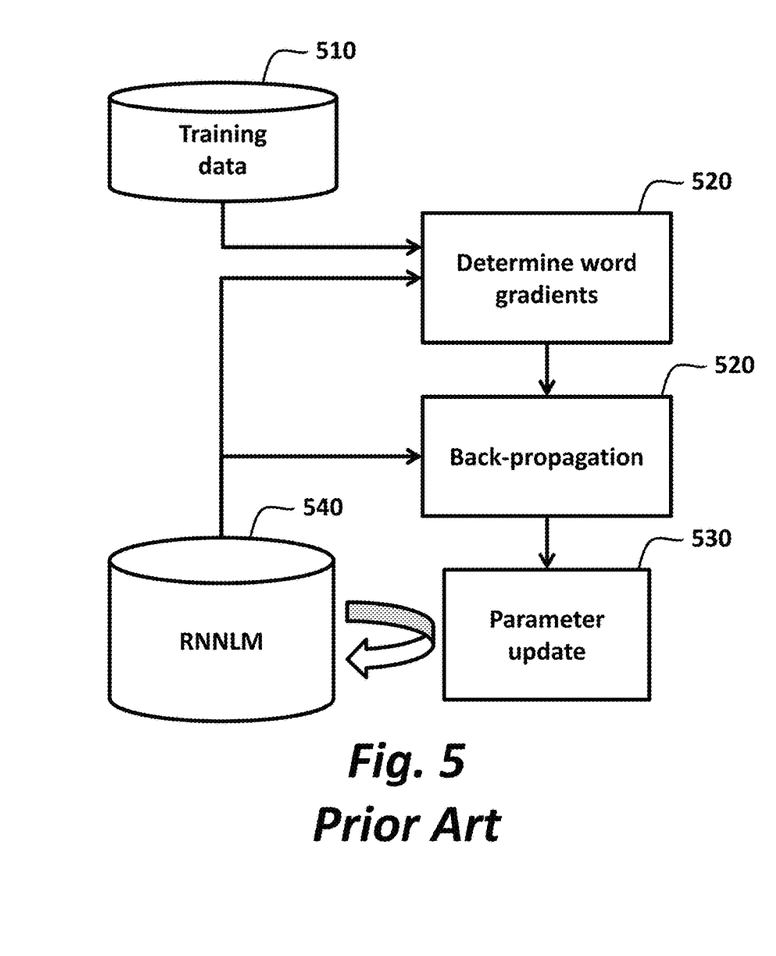
FIG. 5 is block diagram of conventional entropy training of an RNNLM.

For comparison, FIG. 5 shows a conventional method to train an RNNLM 540 using a cross entropy criterion. The input 510 is a training data including word sequences, for which word gradients are determined 520 and back-propagated 520 to update the RNNLM.

Figure 6:
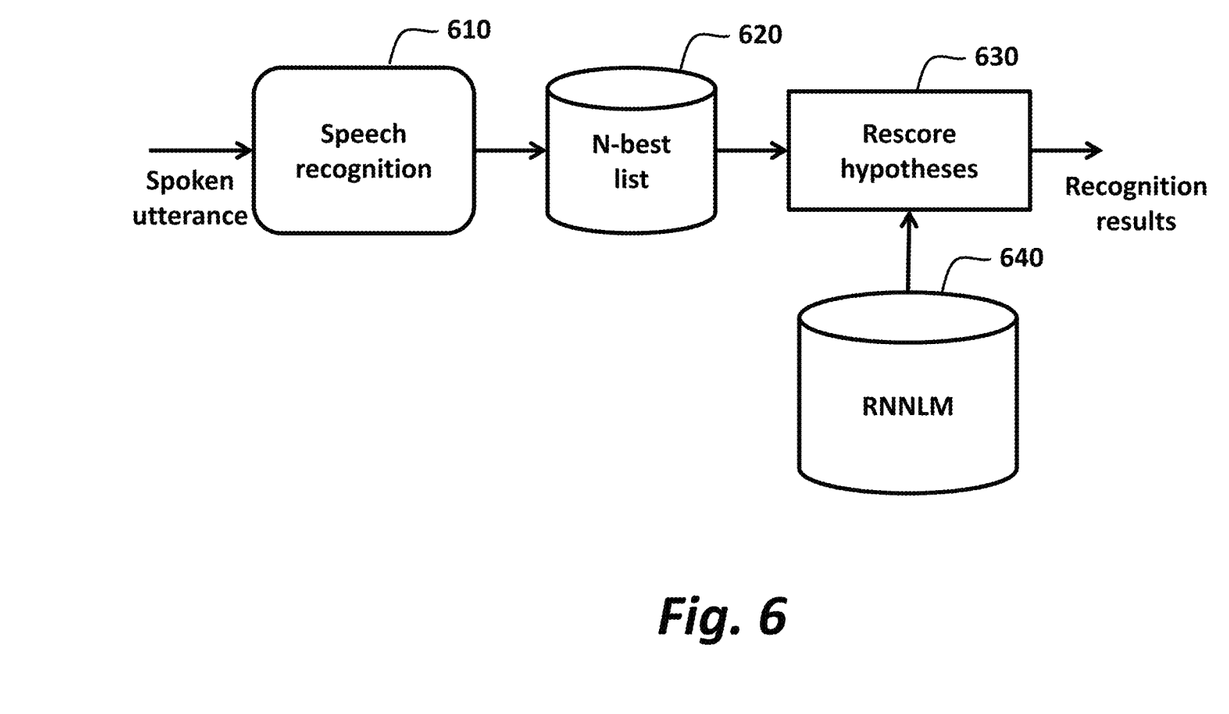
FIG. 6 is a block diagram of speech recognition using an RNNLM according to embodiments of the invention.

FIG. 6 is an overview of the speech recognition using the RNNLM 640 according to embodiments of the invention. The spoken utterances are fed to the ASR 610 to obtain the N-best list 620. Each hypothesis in the N-beset list is rescored 630 using the RNNLM 640 to obtain the best-rescored hypothesis as a recognition result.

Figure 2:
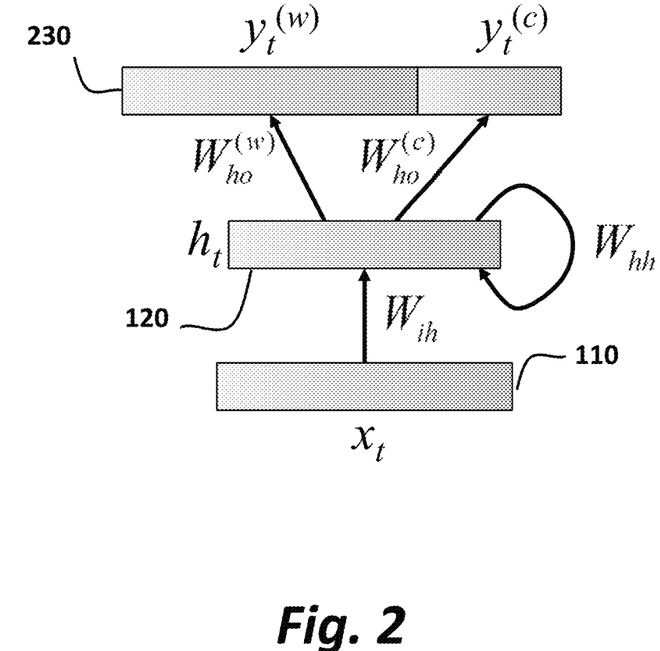
FIG. 2 is a block diagram of a class-based recurrent neural network language model (RNNLM) according to embodiments of the invention.

For a class-based RNNLM as shown in FIG. 2, the output vector $y_t \in [0,1]^{|V|+|C|}$ 230 with |C|, i.e., the number of classes, includes of word (w) and class (c) outputs $$y_t = \begin{bmatrix} y_t^{(w)} \\ y_t^{(c)} \end{bmatrix}, \quad (5)$$

which can be obtained as $$y_{t,m}^{(w)} = \zeta(W_{ho,m}^{(w)} h_t) \quad (6)$$

$$y_t^{(c)} = \zeta(W_{ho}^{(c)} h_t) \quad (7)$$

where $y_{t,m}^{(w)}$ and $W_{ho,m}^{(w)}$ are sub-vectors of $y_t^{(w)}$ and a sub-matrix of $W_{ho}$ corresponding to the words in an in m-th class, respectively, and $W_{ho}^{(c)}$ is a sub-matrix of $W_{ho}$ for the class output.

A word occurrence probability is $$P(w_t|h_t) = y_{t,C(w_t)}^{(w)}[w_t] \times y_t^{(c)}[C(w_t)] \quad (8)$$

where C(w) denotes an index of the class to which the word w belongs. With the class-based architecture, the complexity for propagating activations from the hidden layer to the output layer can be reduced, because we only use the words in the class of the current word to determine a softmax function rather than all the words in the vocabulary.

As an extension of RNNs, Long Short-Term Memory (LSTM) RNNs can be applied to language modeling. It is well known that the conventional RNNs cannot hold the hidden activation information for long time because the activation pattern at a certain time is exponentially decaying according as iterative propagation through time, and it is difficult to train interdependence between distant events.

Figure 3:
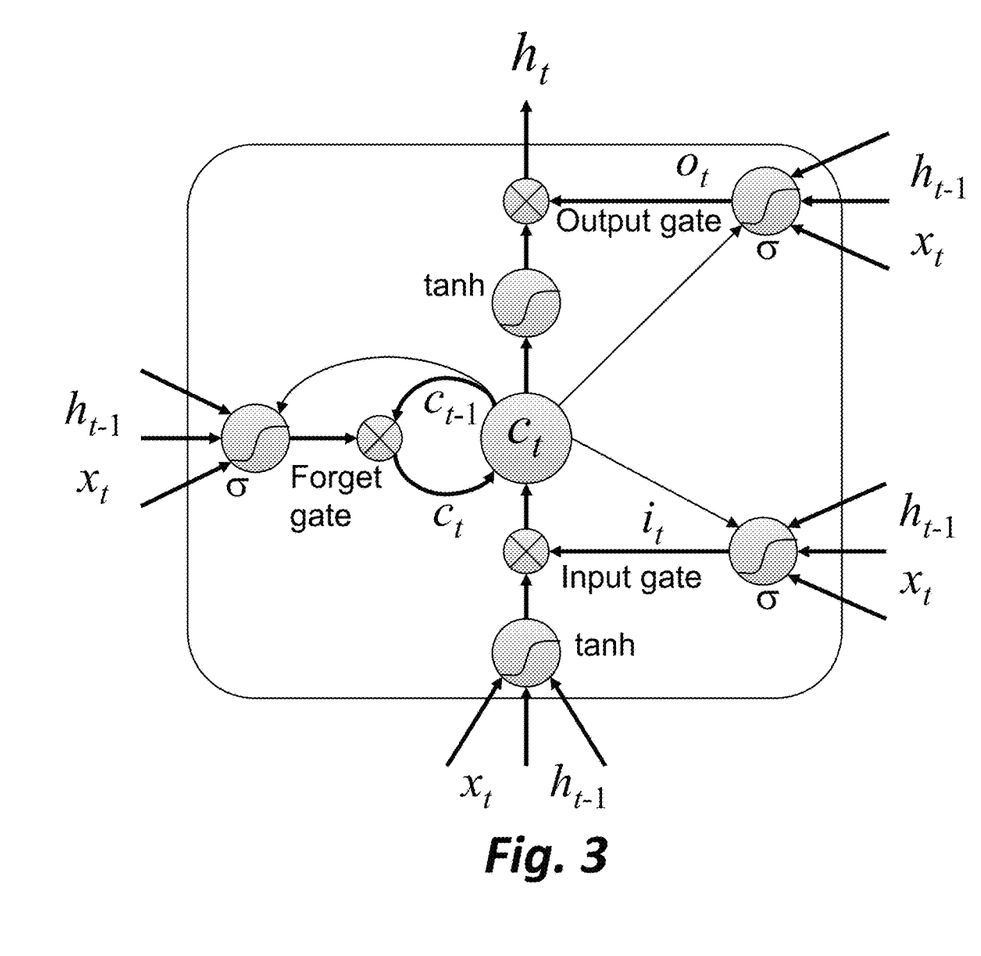
FIG. 3 is a schematic of a long short-term memory used by embodiments of the invention

To solve this problem, the LSTM has memory cells instead of regular network units. An LSTM cell can remember a value for an arbitrary length of time, which contains input, forget, and output gates that determine when the input is significant enough to remember, when it should continue to remember or forget the value, and when it should output the value. An example of LSTM cell is depicted in FIG. 3. A description of the figure is given in the related application.

Minimum Word Error Training for RNNLMs

A loss function of minimum word error training is $$L(\Lambda) = \sum_{k=1}^{K} \sum_{W \in V^*} E(W_k^{(R)}, W) P_\Lambda(W \mid O_k), \quad (9)$$

where $\Lambda$ is a set of model parameters, K is the number of utterances in training data, $O_k$ is a k-th acoustic observation sequence, and $W_k^{(R)} = \{w_{k,1}^{(R)}, \ldots, w_{k,T_k}^{(R)}\}$ is a k-th reference word sequence, $E(W',W)$ represents an edit distance between two word sequences $W'$ and $W$, and $P_\Lambda(W|O)$ is a posterior probability of W determined with the set of model parameter $\Lambda$.

We use a set of N-best lists and obtain a loss function $$L(\Lambda) = \sum_{k=1}^{K} \sum_{n=1}^{N} E(W_k^{(R)}, W_{k,n}) P_\Lambda(W_{k,n} \mid O_k), \quad (10)$$

where $W_{k,n} = \{w_{k,n,1}, \ldots, w_{k,n,T_{k,n}}\}$ is a word sequence of an n-th hypothesis in the N-best list for the k-th utterance, and $T_{k,n}$ denotes a number of words in hypothesis $W_{k,n}$, and the posterior probability of $W_{k,n}$ is determined as $$P_\Lambda(W_{k,n} \mid O_k) = \frac{\exp(g_{k,n})}{\sum_{m=1}^{N} \exp(g_{k,m})}, \quad (11)$$

where $g_{k,n}$ is a log-likelihood score of hypothesis $W_{k,n}$ obtained by $$g_{k,n} = \alpha \log P_{\Lambda_L}(W_{k,n}) + \log P_{\Lambda_A}(O_k \mid W_{k,n}), \quad (12)$$

and $\Lambda_L$ and $\Lambda_A$ are sets of language and acoustic model parameters, respectively. We assume that $\Lambda_A$ is fixed in language model training. and $\alpha$ is a scaling factor to balance acoustic and language scores.

A language log-probability is obtained by the RNNLM as $$\log P_{\Lambda_L}(W_{k,n}) = \sum_{t=1}^{T_{k,n}} \log P_{\Lambda_L}(w_{k,n,t} \mid h_{k,n,t}) = \quad (13)$$

$$\begin{cases} \sum_{t=1}^{T_{k,n}} \log y_{k,n,t}[w_{k,n,t}], \\ \sum_{t=1}^{T_{k,n}} \log y_{k,n,t,C(w_{k,n,t})}^{(w)}[w_{k,n,t}] \times y_{k,n,t}^{(c)}[C(w_{k,n,t})] \end{cases}$$

where $y_{k,n,t}[w_{k,n,t}]$ corresponds to an output of the RNNLM for the t-th word in $W_{k,n}$. Each word probability can be determined using a word-based model (the upper part in the braced expression, or class-based model the lower part, according to Eq. (8).

Hereafter, we describe the optimization procedure only for the word-based RNNLMs, but the procedure can be easily extended for class-based RNNLMs.

We obtain partial derivatives of the loss function $L(\Lambda)$ with respect to $\Lambda_L$ for back propagation over time with a (BPTT) procedure. For simplicity, here we only use the derivative with respect to each RNNLM's output $o_{k,n,t}$ before applying the softmax function, i.e., $\partial L(\Lambda)/\partial o_{k,n,t}[i]$, where $$y_{k,n,t}[w_{k,n,t}] = \frac{\exp(o_{k,n,t}[w_{k,n,t}])}{\sum_{i=1}^{|V|} \exp(o_{k,n,t}[i])}. \quad (14)$$

The derivative can be factorized into two derivatives using a chain rule as $$\frac{\partial L(\Lambda)}{\partial o_{k,n,t}[i]} = \frac{\partial L(\Lambda)}{\partial g_{k,n}} \frac{\partial g_{k,n}}{\partial o_{k,n,t}[i]}. \quad (15)$$

The first factor corresponds to the differences with respect to the N-best hypothesis scores, and the second factor corresponds to those of RNN's output. The first factor is the hypothesis gradient, and the second factor is the word gradient. Accordingly, if we obtain the hypothesis gradient for each N-best hypothesis, then the original BPTT procedure can be performed over N-best hypotheses using the multiplication of these two factors as the error signal for the RNNLM.

By substituting Eqs. (11) and (12) into Eq. (10), the hypothesis gradient can be obtained as $$\frac{\partial L(\Lambda)}{\partial g_{k,n}} = \sum_{n'=1}^{N} E(W_k^{(R)}, W_{k,n'}) P_\Lambda(W_{k,n} \mid O_k) \{\delta_{n,n'} - P_\Lambda(W_{k,n'} \mid O_k)\}, \quad (16)$$

$$= P_\Lambda(W_{k,n} \mid O_k) \{E(W_k^{(R)}, W_{k,n}) - \overline{E}^{(k)}\},$$

where $\overline{E}^{(k)}$ stands for the expectation of the number of word errors, which corresponds to $$\overline{E}^{(k)} = \sum_{n'=1}^{N} E(W_k^{(R)}, W_{k,n'}) P_\Lambda(W_{k,n'} \mid O_k). \quad (17)$$

The word gradient is obtained with the same way as the case of cross entropy criterion by using Eqs. (13) and (14).

$$\frac{\partial g_{k,n}}{\partial o_{k,n,t}[i]} = \frac{\partial y_{k,n,t}[w_{k,n,t}]}{\partial o_{k,n,t}[i]} = (\delta_{i,w_{k,n,t}} - y_{k,n,t}[i]). \quad (18)$$

As described in the above equations, the hypothesis gradient has an effect that when the number of errors is larger than its mean value, the error signal of Eq. (18), i.e., the word gradient, is emphasized toward the positive direction, and if the number of errors is smaller, the error signal is emphasized toward the negative direction.

In the training iterations, we apply a stochastic gradient descent method on an utterance-by-utterance basis, i.e., the gradients are accumulated over N-best hypotheses in the list.

For each hypothesis, BPTT is performed with the error vector obtained by Eqs. (15-18). After processing each N-best list, the parameters are updated with the sum of gradients.

However, the method needs more computations than conventional cross-entropy-based training because the number of sentences increases by N times for N-best lists. We solve this problem by parallelization with graphics processing units (GPUs). Actually, gradient accumulation can be performed in parallel over multiple hypotheses in each N-best list. Ee input multiple words at the same time to the RNNLM, where all the words are located at the same position in the different sentences of the N-best list. Because the set of words, hidden activations, and output probabilities can be represented as a matrix, most steps in training can be performed by matrix-matrix operations on a graphic processer unit (GPU).

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for speech recognition to reduce recognition errors using a language model, wherein the language model is a recurrent neural network language model (RNNLM) that is in communication with a Long Short-Term Memory (LSTM), comprising the steps of:
   acquiring training samples during a training stage for training the RNNLM to perform
      applying an automatic speech recognition system (ASR) to the training samples to produce recognized words and probabilites of the recognized words;
      selecting an N-best list from the recognized words based on the probabilities;
      determining word errors using reference data for hypotheses in the N-best list;
      rescoring the hypotheses using the RNNLM in communication with the LSTM;
      determining gradients for the hypotheses using the word errors, wherein the determined gradients for the hypotheses corresponds to differences with respect to the N-best hypothesis scores;
      determining gradients for recognized words in the hypotheses;
      back-propagating the gradients;
      updating parameters of the RNNLM using a sum of the gradients as an error signal for the RNNLM, so as to the reduce recognition errors of the ASR;
   acquiring spoken utterances as an input to the RNNLM to produce the recognized words;
   producing the N-best list from the recognized words; and
   applying the RNNLM to the N-best list to obtain recognition results, wherein the steps are performed in a processor.

2. The method of claim 1, wherein a stochastic gradient descent method is applied on an utterance-by-utterance basis so that the gradients are accumulated over the N-best list.

3. The method of claim 1, wherein an output vector $y_t \in [0,1]^{|V|+|C|}$ (|C|, is a number of classes, includes of word (w) and class (c) outputs $$y_t = \begin{bmatrix} y_t^{(w)} \\ y_t^{(c)} \end{bmatrix},$$

obtained as $$y_{t,m}^{(w)} = \zeta(W_{ho,m}^{(w)} h_t), \text{ and}$$

$$y_t^{(c)} = \zeta(W_{ho}^{(c)} h_t),$$

where $y_{t,m}^{(w)}$ and are sub-vector of $y_t^{(w)}$ and sub-matrix of $W_{ho}$ corresponding to the words in an m-th class, respectively, and $W_{ho}^{(c)}$ is a sub-matrix of $W_{ho}$ for the class output, where $W_{ho}$ is a matrix placed between a hidden layer and the output layer of the RNNLM, $h_t$ is a D dimensional activation vector $h_t \in [0,1]^D$ in a hidden layer, and $\zeta(\cdot)$ denotes a softmax function that determines a softmax for elements of the vectors.

4. The method of claim 3, wherein a word occurrence probability is $$P(w_t|h_t) = y_{t,C(w_t)}^{(w)}[w_t] \times y_t^{(c)}[C(w_t)]$$

where C(w) denotes an index of the class to which the word w belongs.

5. The method of claim 4, wherein a loss function of minimum word error training is $$L(\Lambda) = \sum_{k=1}^{K} \sum_{W \in V^*} E(W_k^{(R)}, W) P_\Lambda(W | O_k),$$

where $\Lambda$ is a set of model parameters, K is the number of utterances in training data, $O_k$ is a k-th acoustic observation sequence, and $W_k^{(R)} = \{w_{k,1}^{(R)}, \ldots, w_{k,T_k}^{(R)}\}$ is a k-th reference word sequence, E(W',W) represents an edit distance between two word sequences W' and W, and $P_\Lambda(W|O)$ is a posterior probability of W determined with the set of model parameter $\Lambda$.

6. The method of claim 5, further comprising:
   obtaining, the the N-best lists and obtain a loss function $$L(\Lambda) = \sum_{k=1}^{K} \sum_{n=1}^{N} E(W_k^{(R)}, W_{k,n}) P_\Lambda(W_{k,n} | O_k),$$

where $W_{k,n} = \{w_{k,n,1}, \ldots, w_{k,n,T_{k,n}}\}$ is a word sequence of an n-th hypothesis in the N-best list for the k-th utterance, and $T_{k,n}$ denotes a number of words in hypothesis $W_{k,n}$, and the posterior probability of $W_{k,n}$ is $$P_\Lambda(W_{k,n} | O_k) = \frac{\exp(g_{k,n})}{\sum_{m=1}^{N} \exp(g_{k,m})},$$

where $g_{k,n}$ is a likelihood score of hypothesis $W_{k,n}$ obtained by $$g_{k,n} = \alpha \log P_{\Lambda_L}(W_{k,n}) + \log P_{\Lambda_A}(O_k | W_{k,n}),$$

and $\Lambda_L$ and $\Lambda_A$ are sets of language and acoustic model parameters, respectively.

7. The method of claim 6, wherein $\Lambda_A$ is fixed in language model training, and $\alpha$ is a scaling factor to balance acoustic and language scores.

8. The method of claim 7, wherein a language log-probability is obtained by the RNNLM as $$\log P_{\Lambda_L}(W_{k,n}) =$$

$$\sum_{t=1}^{T_{k,n}} \log P_{\Lambda_L}(w_{k,n,t} \mid h_{k,n,t}) = \begin{cases} \sum_{t=1}^{T_{k,n}} \log y_{k,n,t}[w_{k,n,t}], \\ \sum_{t=1}^{T_{k,n}} \log y_{k,n,t,C(w_{k,n,t})}^{(w)}[w_{k,n,t}] \times y_{k,n,t}^{(c)}[C(w_{k,n,t})] \end{cases}$$

where $y_{k,n,t}[w_{k,n,t}]$ corresponds to the output of the RNNLM for the t-th word in $W_{k,n}$.

9. The method of claim 8, wherein derivatives of the loss function $L(\Lambda)$ with respect to $\Lambda_L$ for back propagation over time using a (BPTT) procedure.

10. The method of claim 3, wherein the output vector $y_t \in [0,1]^{|V|}$ corresponds to a predicted distribution $$y_t = \zeta(W_{ho} h_t),$$

where $W_{ho}$ is a weight matrix of the output layer, and word occurrence probability of $w_t$ in a context $h_t$ is
$P(w_t|h_t) = y_t[w_t]$, where $y_t[w_t]$ indicates the $w_t$-th element of the vector $y_t$.

11. The method of claim 1, wherein the RNNLM includes a Long Short-Term Memory (LSTM).

12. A method for speech recognition to reduce recognition errors using a language model, wherein the language model is a recurrent neural network language model (RNNLM), comprising the steps of:
acquiring training samples during a training stage for training the RNNLM to perform
applying an automatic speech recognition system (ASR) to the training samples to produce recognized words and probabilites of the recognized words;
selecting an N-best list from the recognized words based on the probabilities;
determining word errors using reference data for hypotheses in the N-best list;
rescoring the hypotheses using the RNNLM;
determining gradients for the hypotheses using the word errors, wherein the determined gradients for the hypotheses corresponds to differences with respect to the N-best hypothesis scores;
determining gradients for recognized words in the hypotheses;
back-propagating the gradients;
updating parameters of the RNNLM using a sum of the gradients as an error signal for the RNNLM, so as to the reduce recognition errors of the ASR;
acquiring spoken utterances as an input to the RNNLM to produce the recognized words;
producing the N-best list from the recognized words; and
applying the RNNLM to the N-best list to obtain recognition results, wherein the steps are performed in a processor.

13. The method of claim 12, wherein the hypothesis gradient includes an effect that when a number of errors is larger than a mean value of the number of errors, the word gradient, or error signal, is obtained as $$\frac{\partial g_{k,n}}{\partial o_{k,n,t}[i]} = \frac{\partial y_{k,n,t}[w_{k,n,t}]}{\partial o_{k,n,t}[i]} = (\delta_{i,w_{k,n,t}} - y_{k,n,t}[i])$$

such that the word gradient is emphasized toward a positive direction, and if the number of errors is smaller, than an error signal is emphasized toward a negative direction.

14. A system for speech recognition to reduce recognition errors using a language model, wherein the language model is a Recurrent Neural Network Language model (RNNLM), comprising:
a Long Short-Term Memory (LSTM);
at least one Graphic Processor Unit (GPU) in communication with the LSTM, the GPU is configured to
acquire training samples during a training stage for training the RNNLM to perform
apply an automatic speech recognition system (ASR) to the training samples to produce recognized words and probabilites of the recognized words;
select an N-best list from the recognized words based on the produced probabilities;
acquire reference data and determine word errors using the reference data for hypotheses in the N-best list;
rescore the hypotheses using the RNNLM;
determine gradients for the hypotheses using the word errors, wherein the determined gradients for the hypotheses corresponds to differences with respect to the N-best hypothesis scores;
determine gradients for recognized words in the hypotheses;
back-propagating the gradients; and
update parameters of the RNNLM using a sum of the gradients as an error signal for the RNNLM, so as to the reduce recognition errors of the ASR;
acquire spoken utterances as an input to the RNNLM to produce the recognized words;
produce the N-best list from the recognized words; and
apply the RNNLM to the N-best list to obtain recognition results.

15. The system of claim 14, wherein an output vector $y_t \in [0,1]^{|V|+|C|}$ (|C|, is a number of classes, includes of word (w) and class (c) outputs $$y_t = \begin{bmatrix} y_t^{(w)} \\ y_t^{(c)} \end{bmatrix},$$

obtained as $$y_{t,m}^{(w)} = \zeta(W_{ho,m}^{(w)} h_t), \text{ and}$$

$$y_t^{(c)} = \zeta(W_{ho}^{(c)} h_t),$$

where $y_{t,m}^{(w)}$ $W_{ho,m}^{(w)}$ are sub-vector of $y_t^{(w)}$ and sub-matrix of $W_{ho}$ corresponding to the words in an m-th class, respectively, and $W_{ho}^{(c)}$ is a sub-matrix of $W_{ho}$ for the class output, where $W_{ho}$ is a matrix placed between a hidden layer and the output layer of the RNNLM, $h_t$ is a D dimensional activation vector $h_t \in [0,1]^D$ in a hidden layer, and $\zeta(\cdot)$ denotes a softmax function that determines a softmax for elements of the vectors.

16. The system of claim 15, wherein a word occurrence probability is $$P(w_t|h_t) = y_{t,C(w_t)}^{(w)}[w_t] \times y_t^{(c)}[C(w_t)]$$

where C(w) denotes an index of the class to which the word w belongs.

17. The system of claim 16, wherein a loss function of minimum word error training is $$L(\Lambda) = \sum_{k=1}^{K} \sum_{W \in V^*} E(W_k^{(R)}, W) P_\Lambda(W \mid O_k),$$

where $\Lambda$ is a set of model parameters, K is the number of utterances in training data, $O_k$ is a k-th acoustic observation sequence, and $W_k^{(R)} = \{w_{k,1}^{(R)}, \ldots, w_{k,T_k}^{(R)}\}$ is a k-th reference word sequence, E(W',W) represents an edit distance between two word sequences W' and W, and $P_\Lambda(W|O)$ is a posterior probability of W determined with the set of model parameter $\Lambda$.

18. The system of claim 17, further comprising:
obtaining, the the N-best lists and obtain a loss function $$L(\Lambda) = \sum_{k=1}^{K} \sum_{n=1}^{N} E(W_k^{(R)}, W_{k,n}) P_\Lambda(W \mid O_k),$$

where $W_{k,n} = \{W_{k,n,1}, \ldots, W_{k,n,T_{k,n}}\}$ is a word sequence of an n-th hypothesis in the N-best list for the k-th utterance, and $T_{k,n}$ denotes a number of words in hypothesis $W_{k,n}$, and the posterior probability of $W_{k,n}$ is $$P_\Lambda(W_{k,n} \mid O_k) = \frac{\exp(g_{k,n})}{\sum_{m=1}^{N} \exp(g_{k,m})},$$

where $g_{k,n}$ is a likelihood score of hypothesis $W_{k,n}$ obtained by $$g_{k,n} = \alpha \log P_{\Lambda_L}(W_{k,n}) + \log P_{\Lambda_A}(O_k \mid W_{k,n}),$$

and $\Lambda_L$ and $\Lambda_A$ are sets of language and acoustic model parameters, respectively.

19. The system of claim 18, wherein $\Lambda_A$ is fixed in language model training, and $\alpha$ is a scaling factor to balance acoustic and language scores.

20. The system of claim 19, wherein a language log-probability is obtained by the RNNLM as $$\log P_{\Lambda_L}(W_{k,n}) = \sum_{t=1}^{T_{k,n}} \log P_{\Lambda_L}(w_{k,n,t} \mid h_{k,n,t})$$

$$= \begin{cases} \sum_{t=1}^{T_{k,n}} \log y_{k,n,t}[w_{k,n,t}], \\ \sum_{t=1}^{T_{k,n}} \log y_{k,n,t,C(w_{k,n,t})}^{(w)}[w_{k,n,t}] \times y_{k,n,t}^{(c)}[C(w_{k,n,t})] \end{cases}$$

where $y_{k,n,t}[w_{k,n,t}]$ corresponds to the output of the RNNLM for the t-th word in $W_{k,n}$.

* * * * *